Sept. 21, 1926.
C. KESSES
1,600,592
MOTION PICTURE MACHINE
Filed Jan. 10, 1922
3 Sheets-Sheet 1
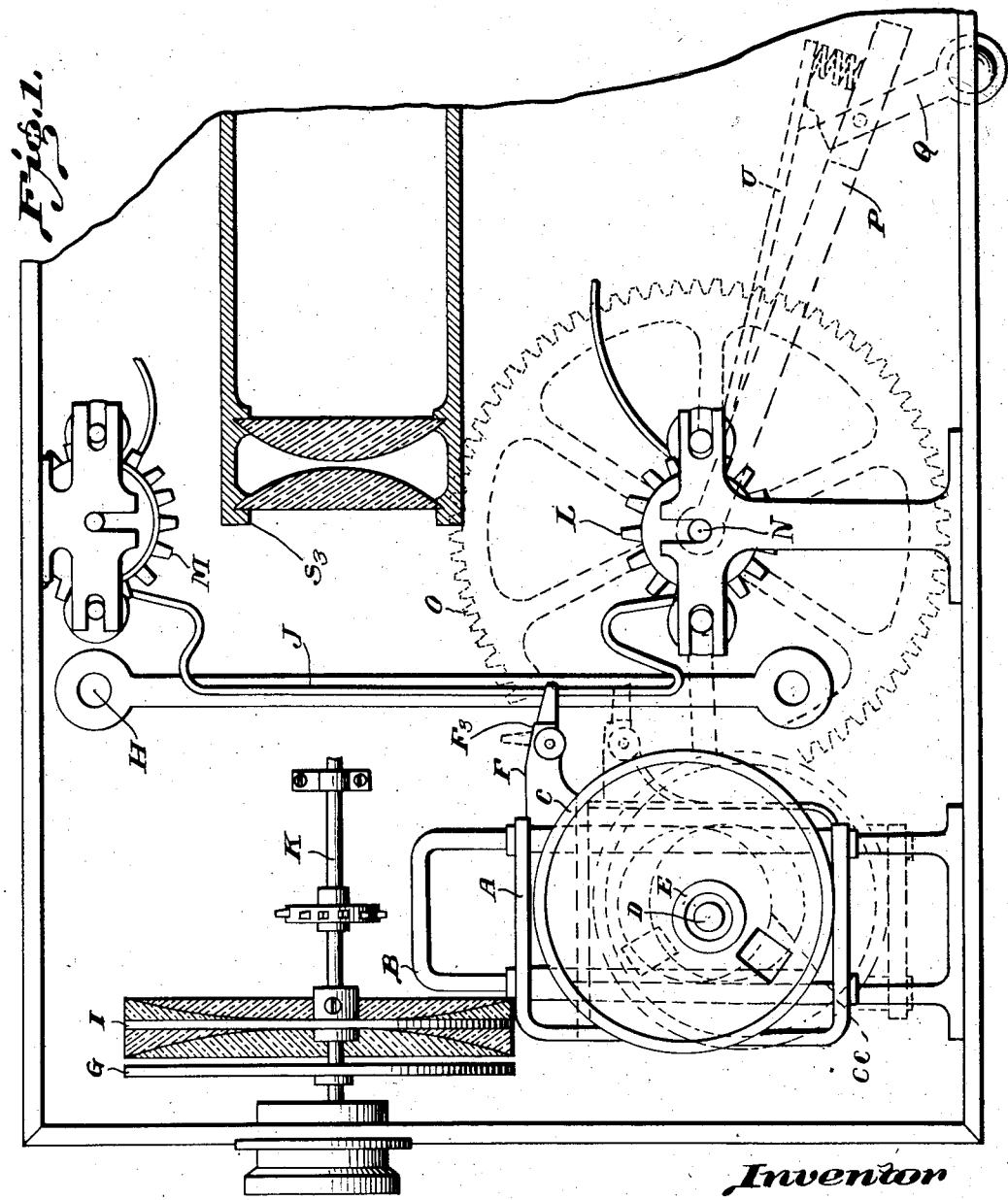
Inventor
Charles Kesses.

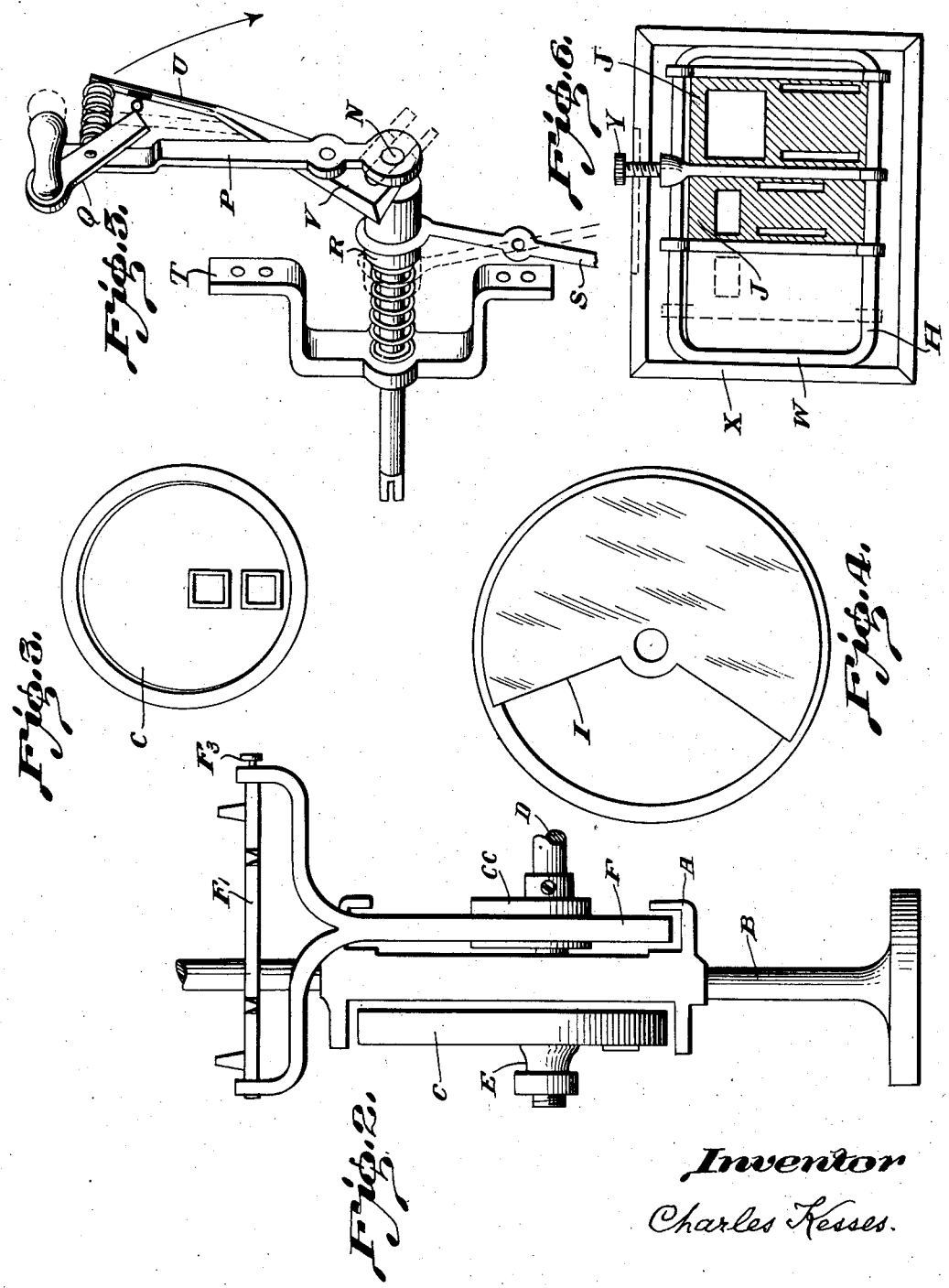

Sept. 21, 1926.                                    1,600,592
C. KESSES
MOTION PICTURE MACHINE
Filed Jan. 10, 1922           3 Sheets-Sheet 3
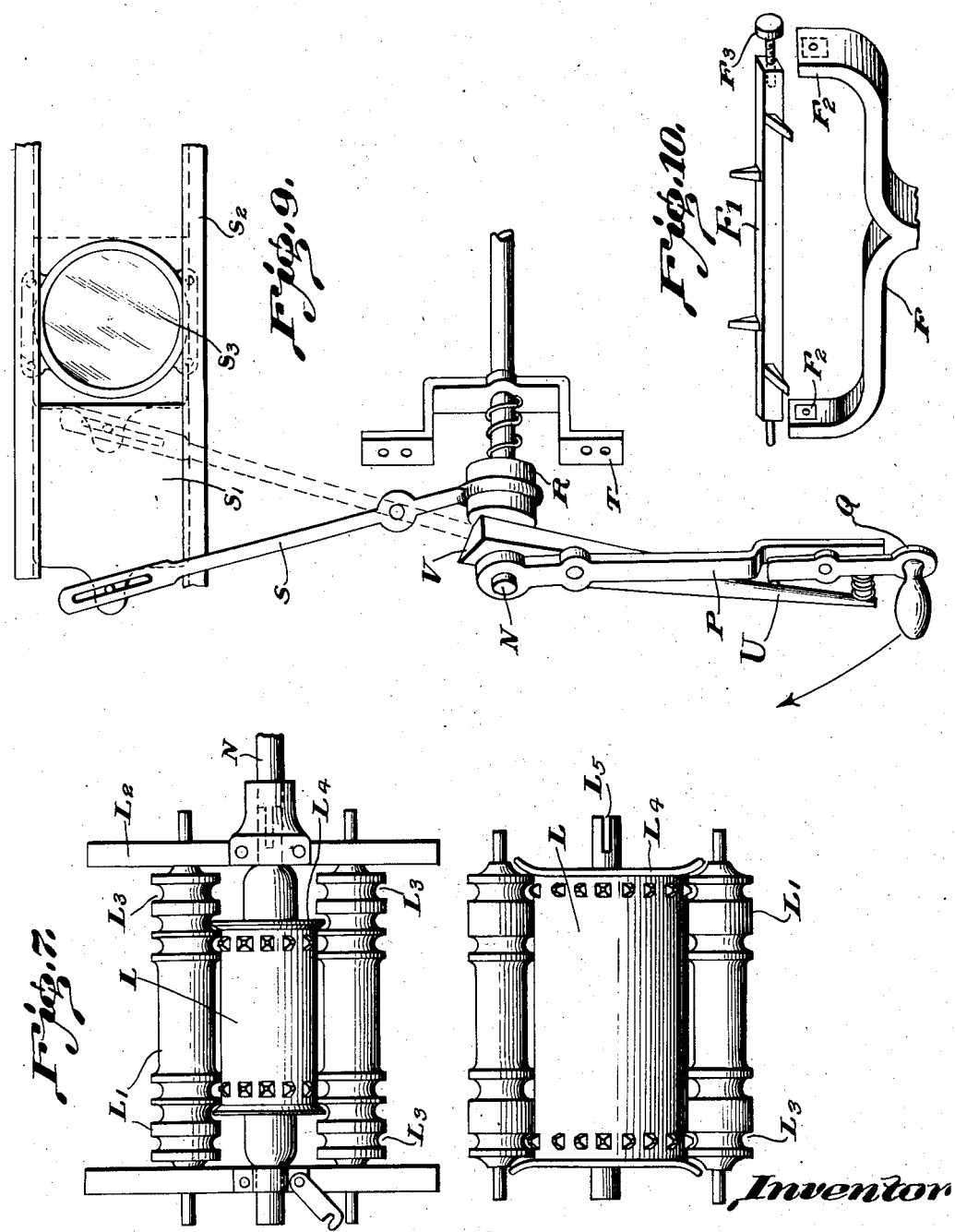

Patented Sept. 21, 1926.  1,600,592

UNITED STATES PATENT OFFICE.

CHARLES KESSES, OF NEW YORK, N. Y.

MOTION-PICTURE MACHINE.

Application filed January 10, 1922. Serial No. 528,351.

This application is related to my patent for a motion picture projector No. 1,281,253, filed Sept. 25, 1917, and to my Patent 1,384,527 filed April 11, 1918, and the objects of my invention are; first, to improve the intermittent film feeding device shown in both of the above patents by arranging two fixed positions in the frictionless cam for the driving shaft, one position for advancing intermittently the film for the height of the standard size pictures and one position for larger pictures for commercial purposes, also two sets of pins for advancing different widths of film and two film supports one for each size of film, each one of which can be used at a moment's notice to make this machine a perfect inexpensive instrument which can be easily changed for taking, projecting and printing of motion pictures and for commercial photography; second, to do away with a dark shutter which prevents the picture and the light from falling on the screen while each picture is advanced and substitutes therefor a picture dissolver consisting of a convexed or a concave glass for bringing the picture out of focus, to show the light and not the picture, since this does not harm the eye as by using a dark shutter; third, by providing the machine with a lever crank, which opens automatically a safety closing door between the light and the film by the turning of said crank and closes said door by the backward turning or by the stopping of said crank.

I attain these objects by the mechanism illustrated in the accompanying drawings in which—

Fig. 1 is a side view of the apparatus wherein is shown a film advancing mechanism in two positions.

Fig. 2 is a front view of said film advancing mechanism, certain parts in the frame F which carry the feeding pins, are shown in a different position from that of Fig. 1.

Fig. 3 is a front view of a cam, showing two fixed openings for a shaft and a rim set in bearings around said cam.

Fig. 4 is a front view of a picture dissolver.

Fig. 5 shows a lever crank, to open automatically a safety closing door between the light and the film.

Fig. 6 a front view of two movable film supports.

Fig. 7 is a view of the structure as seen from above, for holding exchangeable sprocket-wheels of different sizes in a good position.

Fig. 8 is a view of a larger size sprocket-wheel without said structure.

Fig. 9 is a view of a safety door which is arranged in front of the condenser and showing a lever crank in an operative position with said safety door open.

Fig. 10 is a view of the upper part of the slide F in the feeding mechanism, showing the means provided for exchanging one set of feeding pins for another set.

Similar characters refer to similar parts throughout the several views.

An intermittent feeding device is shown in different positions on Figs. 1 and 2. A square frame A is slidably secured on a rail support B. A cam C, a separate view of which is shown on Fig. 3, is set in bearings in an outside rim to reduce the friction between the cam and the horizontal surfaces in the frame A. There are two openings in said cam for a shaft D and a screw E to reset said cam for reciprocating the frame A for different sizes of pictures. A square frame F is slidably arranged in a horiontal direction in the frame A. A second cam CC is secured to the shaft D for reciprocating the frame F in the frame A. The upper part of the frame F carries two sets of exchangeable feeding pins, a separate view of said part being shown in Fig. 10. A square rail $F^2$ carries said pins, one set is for small and one set for wider films. Said rail can be reset for using another set of pins, in the square openings $F^2$, in the frame F. A screw $F^3$ secures said rail to said frame.

A rotary shutter G, with one opening is movably secured to a shaft K. A picture dissolver I consisting of a part of a concave or a convex glass to bring the picture which is projected on the screen out of focus is stationarily secured to the shaft K. A rim around said glass must be heavy on the opening side so this picture dissolver can be used as a fly wheel. When the machine is used for taking or printing then the shutter and the dissolver must be secured to each other to revolve in unison. The shaft K is operatively connected to the shaft D with suitable sprocket wheels and chains.

Two film supports J one for the standard size pictures and one support for a wider film strip and for larger sized pictures for commercial purposes are slidably secured on two rails H as is shown in Fig. 6 for using either one of said supports at a moment's notice, a second position of said supports is shown by dotted lines.

The rails H are secured in a square frame W which is movably secured in suitable rails in the casing X of the machine. A screw Y is inserted in said casing and the frame W for moving the film support for the purpose of framing the pictures.

Two sets of sprocket wheels L and M can be exchanged for others of different widths and different diameters, two views of the structure from above are shown in the Figs. 7 and 8. Rollers $L^1$ are slidably arranged in the supports $L^2$, to provide means for holding sprocket wheels with different diameters. Suitable springs may be provided to press the rollers $L^1$ against said sprocket wheels. The form of said rollers must be provided with curves $L^3$, to allow for using of the different sprocket wheels. Rims $L^4$ are secured to said sprocket wheels to give the film a good position. A fork arrangement $L^5$ is provided to connect said sprocket wheels with the main shaft N. A suitable sprocket chain and sprockets connects the upper feeding sprockets M to the sprockets L.

A gear wheel O secured to the shaft N is meshed to a gear wheel which is secured to the shaft D for operating the shutters and the intermittent feeding device. A suitable pulley on the shaft N is operatively connected with a loose pulley not shown, to wind up the operated film in the lower film box.

A crank to operate the machine is in two parts, one part or arm P is secured to the shaft N, the second part is a lever Q which is movably secured by a pin to the arm P. A member R is slidably arranged around the shaft N, a lever S is secured to said member and to a safety closing door which is located between the light and the film. A bracket T is secured in the inside of the casing of the machine for holding the shaft N which is secured in bearings in said bracket in a good position. A lever U is movably secured with a pin to the arm P and is secured with a hinge to the lever Q. A suitable spring is secured on the arm P and the lever U for separating said parts. A second spring is secured between the bracket T and the member R to keep those parts separated. When the lever crank is turned forwards then the pointed bolt V which is secured to the lever U must move the member R towards the bracket T, thereby moving the lever S to open with said lever a safety closing door which must be operatively connected in a suitable manner to said lever. By stopping or back turning of the lever-crank the two springs will move the three levers to their fixed position thereby operating the safety closing door. An open position of said door $S^1$ is shown in Fig. 9. Guide rails $S^2$ for said safety door are secured in a horizontal position to the casing of the condensers $S^3$.

I am aware that prior to my invention dark rotary shutters have been used in motion picture machines, but I never saw or heard of using a lens in any motion picture machine, in such position, or for such purpose before my invention or discovery thereof.

What I claim as new and desire to secure by Letters Patent is—

In a motion picture machine, having in combination an intermittent film feeding mechanism comprising a cam which is provided with two openings at different radial distances from the center of said cam, a movable slide, having means to engage the cam at opposite spaced points on its periphery whereby to reciprocate the slide, each of said openings adapted to receive a driving shaft whereby the slide will be moved through different lengths of movement, means to lock the shaft in either opening, a second cam on said shaft, a second slide having means for reciprocation of said second slide by said cam, sets of adjustable film feeding teeth on said second slide, each said set of feeding teeth having the teeth spaced different distances apart whereby to engage and feed films of different widths, means to move said teeth into and out of operative position.

Signed at New York, in the county of New York and State of New York this 9th day of January, A. D. 1922.

CHARLES KESSES.